United States Patent [19]

Shima

[11] Patent Number: 4,608,642

[45] Date of Patent: Aug. 26, 1986

[54] APPARATUS FOR RECORDING PATTERN INFORMATION AND PRODUCING A KNITTING CONTROL PROGRAM

[75] Inventor: Masahiro Shima, Wakayama, Japan

[73] Assignee: Shima Idea Center Co., Ltd., Wakayama, Japan

[21] Appl. No.: 646,296

[22] Filed: Aug. 31, 1984

[30] Foreign Application Priority Data

Sep. 27, 1983 [JP] Japan .................................. 58-179729

[51] Int. Cl.⁴ .......................... G05B 19/00; D04B 7/24
[52] U.S. Cl. ..................................... 364/470; 364/191; 66/75.2
[58] Field of Search ....................... 364/191, 192, 470; 66/75.2

[56] References Cited

U.S. PATENT DOCUMENTS 3,772,647 11/1973 Christiansen ........................... 66/1 R
4,019,036 4/1977 Hiramatsu .............................. 66/1 R
4,085,597 4/1978 Kamikura .............................. 66/75.2
4,100,768 7/1978 Kamikura .............................. 66/75.2
4,214,460 7/1980 Shima ................................... 66/75.2
4,346,366 8/1982 Kajiura et al. ....................... 364/470

Primary Examiner—Jerry Smith
Assistant Examiner—Allen MacDonald

[57] ABSTRACT

Upon entry into a graphic unit, in coded colors or color codes, of pattern information on a fabric to be knit on a flat knitting machine, as analyzed into units of pattern information, each unit representing one or two stitches formed by one or both of a pair of opposed needles, front and back, the units of pattern information are displayed on a graphic color monitor in the coded colors and in dots, one dot representing one unit of pattern information, and they are stored into storage means in a process unit. Units of pattern information so stored are read in sequential order of knitting and those for each knitting course are translated into pattern data for needle selection in each knitting course and/or into control data for controlling knitting, transfer, racking and the like operations in each knitting course. The pattern and/or control datas are recorded on a desired medium such as paper tape, magnetic tape or floppy desk.

1 Claim, 18 Drawing Figures

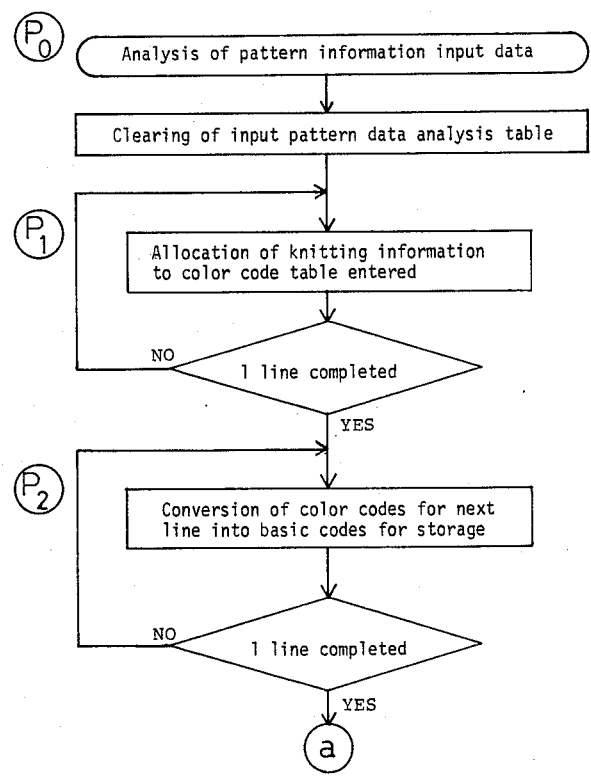

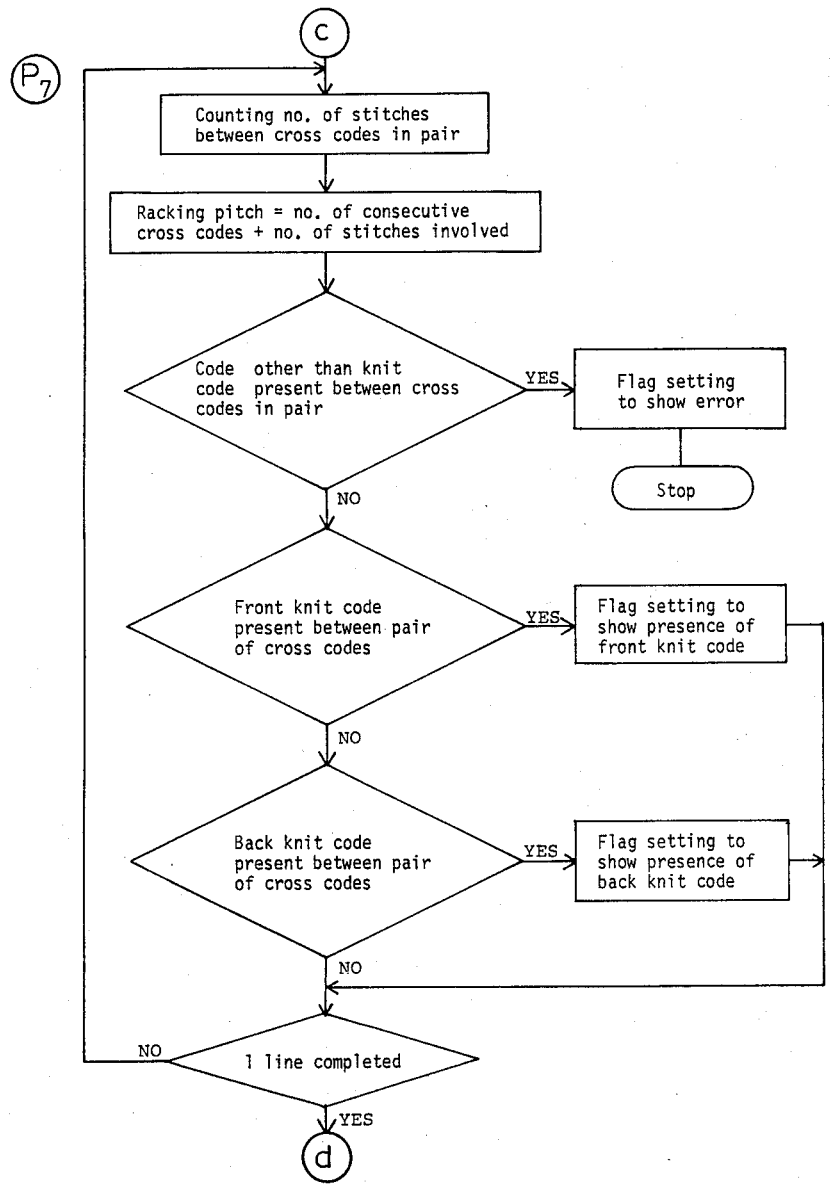

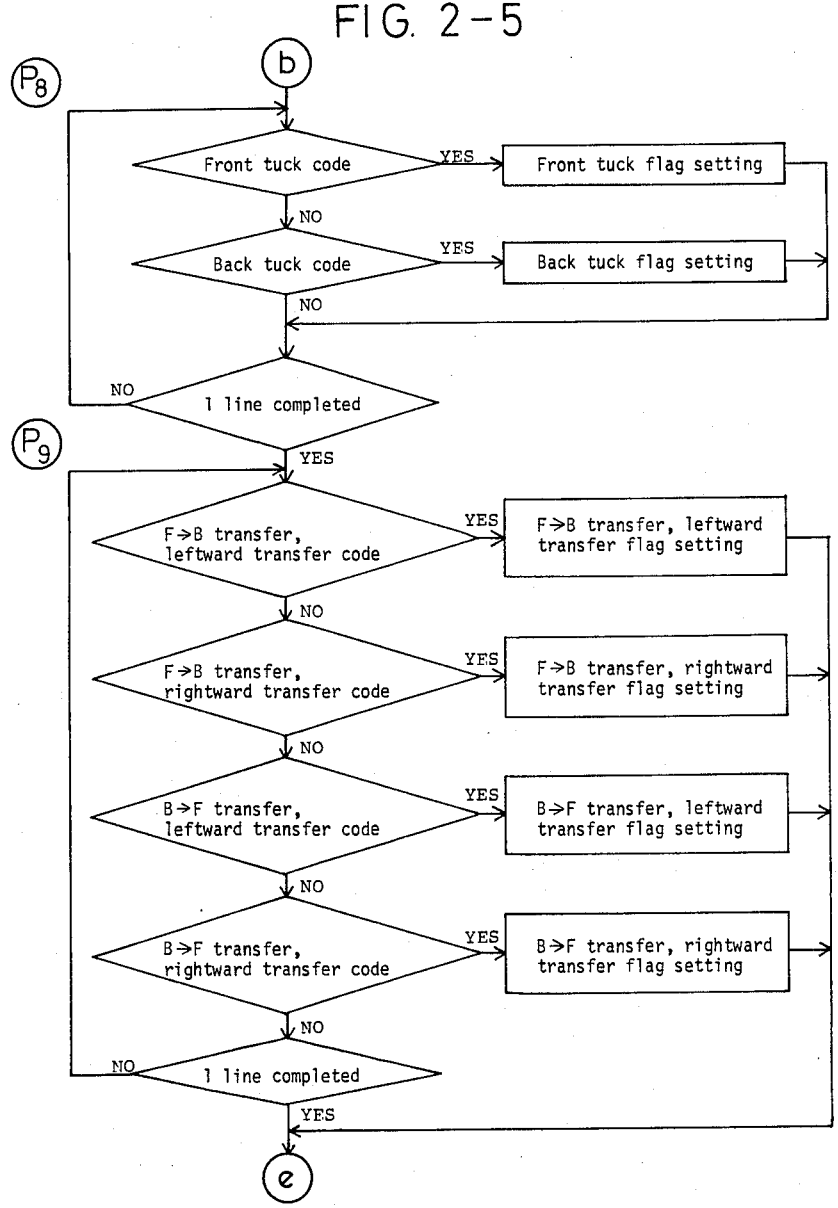

TO FIG. 2 - 7

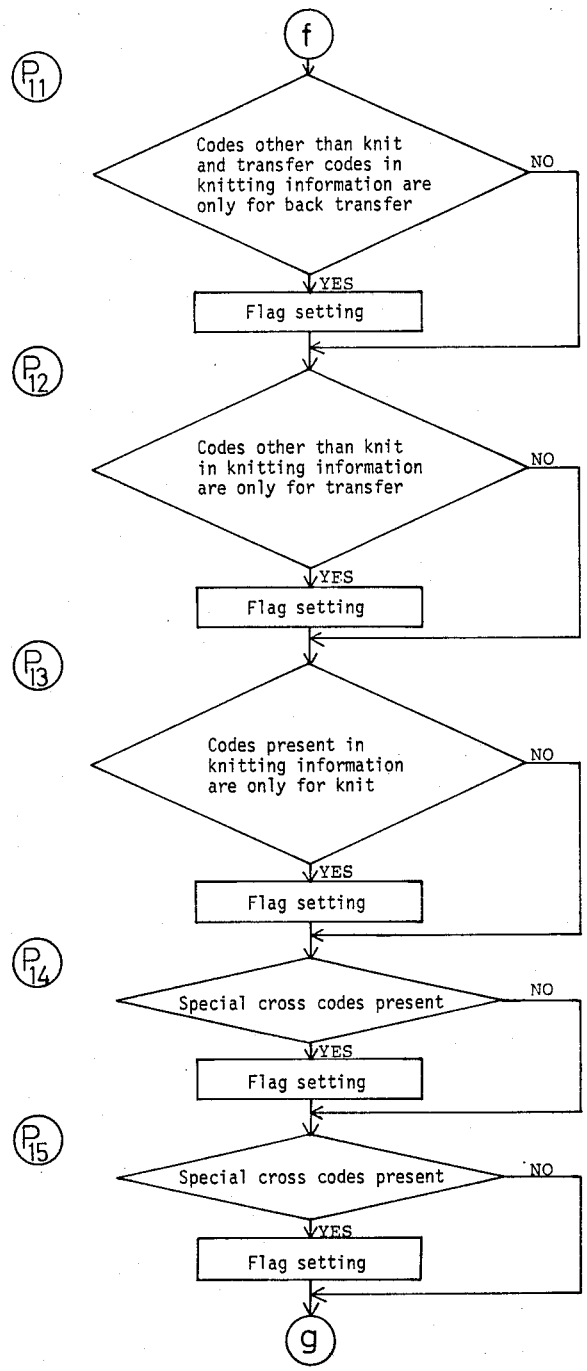

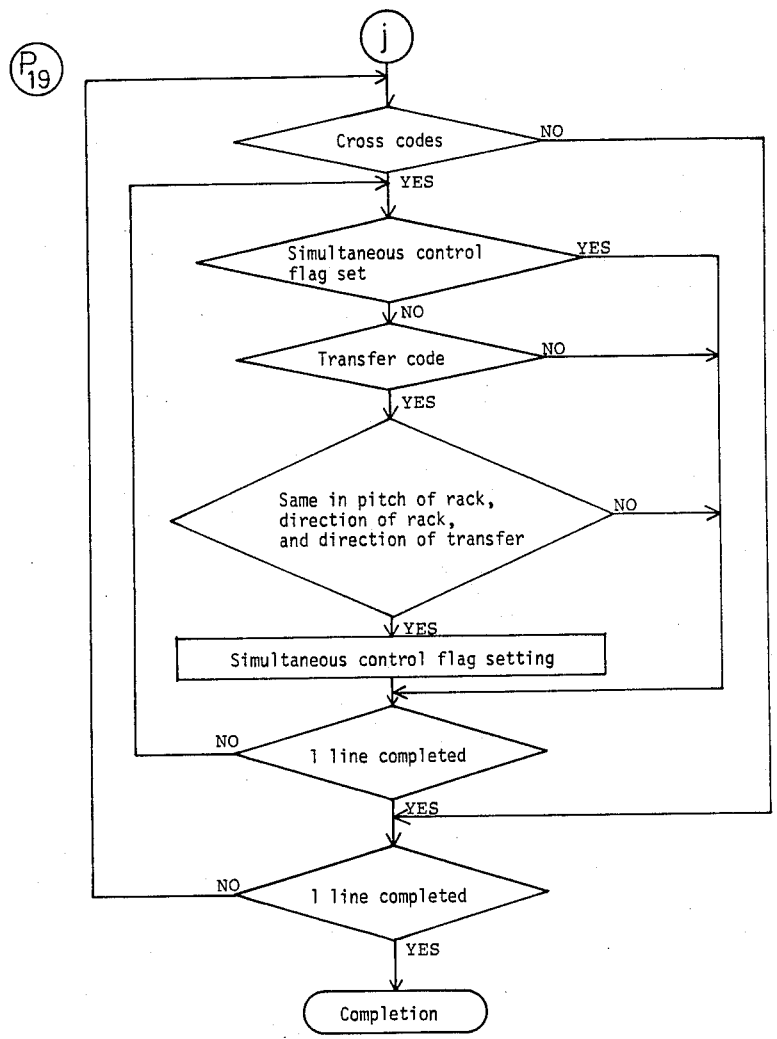

FIG. 5-1

| Knit Course | | Control Data | | Pattern Data | Condition of Stitches Formed |
|---|---|---|---|---|---|
| NO. | Dir. | Rack | Knit | | |
| 1 | ↑ | 0P | Knit | B ooo......ooooo...ooo...<br>F ................................. | |
| 2 | ↓ | 0P | Knit | B ooo......................<br>F .........ooooo...oooo... | |
| 3 | ↑ | 0P | Transfer ← | B ............................<br>F ......ooooo...oooo... | |
| 4 | ↓ | L 2P | Transfer → | B ............................<br>F ................oo....... | |
| 5 | ↑ | L 3P | Transfer → | B ............................<br>F ...........ooo........... | |
| 6 | ↓ | R 2P | Transfer → | B ............................<br>F ...........oo............ | |
| 7 | ↑ | R 3P | Transfer → | B ............................<br>F ......ooo................ | |

FIG. 5-2

| Knit Course | | Control Data | | Pattern Data | Condition of Stitches Formed |
|---|---|---|---|---|---|
| No. | Dir. | Rack | Knit | | |
| 8 | ↓ | 0P | Knit Empty | B · · · · · · · · · · · · · · ·<br>F · · · · · · · · · · · · · · · | |
| 9 | ↑ | 0P | Knit Tuck | B o o o · · · · o o o · · · ·<br>F · · · · · o o o o o o · · · · | |
| 10 | ↓ | 0P | Knit Tuck | B o o o · · · · o o o · · · ·<br>F · · · · · o o o o o o · · · · | |
| 11 | ↑ | 0P | Knit | B o o o · · · · · o o o · · · ·<br>F · · · · · o o o o o o · · · · | |
| 12 | ↓ | 0P | Knit | B o o o · · · · · o o o · · · ·<br>F · · · · · o o o o o o · · · · | |
| 13 | ↑ | 0P | ← Transfer | B · · · · · · · · · · · · · · ·<br>F · · · · · o · o · · · · | |
| 14 | ↓ | L 1P | Transfer → | B · · · · · · · · · · · · · · ·<br>F · · · · o · · · o · · · · | |

FIG. 5-3

| Knit Course | | Control Data | | Pattern Data | Condition of Stitches Formed |
|---|---|---|---|---|---|
| NO. | Dir. | Rack | Knit | | |
| 15 | ↑ | R 1P | Knit | B ooo......ooooo...ooo<br>F ....ooooo......oooo | |
| 16 | ↓ | 0P | Knit | B ooo......ooooo...ooo<br>F ....ooooo......oooo | |
| 17 | ↑ | 0P | Transfer → | B ooo...............ooo<br>F ....ooooooo...oooo | |
| 18 | ↓ | 0P | ← Transfer | B ...................<br>F ....ooooooo...oooo | |
| 19 | ↑ | 0P | Knit | B ooo...............ooo<br>F ....ooooooo...oooo | |
| 20 | ↓ | 0P | Knit | B ooo...............ooo<br>F ....ooooooo...oooo | |

APPARATUS FOR RECORDING PATTERN INFORMATION AND PRODUCING A KNITTING CONTROL PROGRAM

BACKGROUND OF THE INVENTION

The present invention relates to an apparatus for recording pattern information for control of the operation of a flat knitting machine, which is employed to write on a recording medium such information in the form of pattern data and/or control data for each knitting course of a carriage.

U.S. Pat. No. 4,214,460 discloses a flat knitting machine having an electromechanical needle selecting mechanism which is such that pattern information for knitting, previously recorded in a recording medium, e.g. paper tape, is read by a reader in a controller unit attached to the knitting machine and is then stored in a computer means in the controller unit. Needle selection and other relevant functions of the machine for each knitting course can thus be electro-mechanically controlled by the controller unit according to the pattern information stored in the computer means.

With such flat knitting machine it is a usual practice that pattern information for each knitting course is recorded by punching the recording medium or paper tape and is then input into the computer means in the controller unit by having the punched paper tape read by the reader.

Now, a V-bed flat knitting machine, unlike a single-bed flat knitting machine or circular knitting machine, has a pair of needle beds, front and back. With such knitting machine, not only is it possible to produce varieties of knit patterns by selectively causing the needles to knit, tuck or miss during the movement of the carriage, but also it is possible to fashion further varieties of knit patterns by transferring loops between the beds and racking one of the beds before or after loop transferring during carriage movement. Where a V-bed flat knitting machine is employed, therefore, it is necessary to input into the computer means such pattern information as to which stitch or stitches hanging on which needle or needles are to be transferred in which knitting course of the carriage, and how many pitches and in which direction one of the beds is to be racked before or after such loop transfer, as well as other pattern information.

In the case of a knit pattern consisting simply of a combination of knit, tuck and miss, which can be mechanically produced on a single-bed flat knitting machine, one course of stitches in the knit fabric corresponds to one knitting course of the carriage, and therefore, necessary pattern information for knitting one course of stitches can be plotted on a square-ruled mark sheet, with one stitch shown in one grid. That is, pieces of pattern information for the course direction of a fabric to be knit are plotted on X coordinate axis on the mark sheet and pieces of pattern information for the wale direction of the fabric are plotted on Y coordinate axis, whereby a final knit pattern of the fabric to be knitted can be easily envisaged. The mark sheet having such plottings made thereon provides data as to which needles should be in the operative zone of a cam or cams during the movement of the carriage for each knitting course, since each course of stitches shown on the mark sheet corresponds to one knitting course of the carriage.

Therefore, from such mark sheet and by using reader means for optically reading the pattern information present on the mark sheet for conversion into electric signals and a paper-tape puncher for punching a tape with pattern signal holes according to the electric signals from the reader means it is readily possible to prepare a pattern tape punched with holes representing pattern data for each knitting course.

However, in the case of a knitting pattern involving a loop transfer in a particular knitting course and needle-bed racking before or after the loop transfer, the situation is not so simple, because several courses of carriage movement are required in order to obtain the desired pattern for the particular one course. For example, if one on the righthand side of two front stitches located in side-by-side relation on two adjacent needles in the front needle bed is to be placed on the lefthand-side stitch in overlapping relation, it is necessary to transfer the righthand-side stitch onto a needle opposite thereto in the back needle bed and rack the back bed one pitch leftward, and then to transfer the stitch from the back-bed needle to the front-bed needle. After the righthand stitch is thus placed on the lefthand stitch in overlapping relation, the back bed must be racked one pitch rightward. In order to prepare from a mark sheet a pattern tape punched with holes representing such racked-pattern information, therefore, the mark sheet must carry pattern information for several knitting courses of the carriage as obtained by analyzing pattern information for one course of stitches in the fabric to be knit.

That is, when writing racked-pattern or other complicated pattern information manually on the mark sheet, the operater must first thoroughly understand the sequence of operation of various parts of the V-bed flat knitting machine and then analyze necessary pattern data for one course of stitches and control data for knitting and transfer locks and needles into data for several courses of carriage movement involved while envisaging the pattern and control datas. Conventionally, therefore, the work of writing such information on the mark sheet requires a high degree of skill and considerable trouble.

The fact that where racked pattern or the like is involved, pattern information for each individual course of stitches must be analyzed into pattern data for a number of knitting courses of the carriage, partially and randomly, as above stated, poses another problem with the prior-art method of encoding pattern information for V-bed flat knitting machine operation. Although such pattern information written on the mark sheet in aforesaid manner comprises pieces of wale-directional pattern information and of course-directional pattern information as shown along X and Y coordinate axes, the analyzed information is so complicated that even a skilled operator could not evisage a final pattern from the mark sheet. As such, it is extremely difficult to check to see that the pattern information on the mark sheet is right and/or to correct errors thereon, if any.

Another problem is that pattern information shown on the mark sheet in manner as aforesaid is limited to pattern data for individual knitting courses of the carriage, e.g. which needle or needles are to be controlled to the operative position of the knitting lock or transfer lock and in which knitting course; such pattern information does not include control data for individual knitting courses, e.g. data as to whether or not the knitting lock and/or transfer lock are to be controlled to the operative position thereof relative to needles in a particular knitting course, or as to which needle bed, front or back, are to be racked rightward or leftward before or after a particular knitting course.

In the prior-art recording method for pattern information, therefore, a program sheet on which various control items for the carriage are shown correspondingly to the arrangement of tape puncher keys is employed, separately from the aforesaid mark sheet, to provide such control data necessary for the control of knitting operation for each individual knitting course. That is, control data for each knitting course, developed in manner as above described, is written on the program sheet; and according to each relevant entry on the program sheet, such control data for each knitting course is key input into the tape puncher for preparation of a control tape. As is the case with the writing of pattern data onto the mark sheet, the work of entering control data for each knitting course manually onto the program sheet requires a high degree of skill and considerable labor. Likewise, key entry of control items into the tape puncher takes much trouble.

SUMMARY OF THE INVENTION

Accordingly, it is an object of the present invention eliminate the aforesaid difficulty involved in writing racked-pattern information or the like for the control of flat-knitting machine operation onto such recording medium as pattern tape.

It is another object of the invention to provide a novel apparatus for recording pattern information for control of V-bed flat knitting machine operation which permits writing of such control pattern information onto a recording medium at ease and without requiring a high degree of skill, and which permits the pattern information so written to be readily identified in the light of a pattern displayed on display means, thus allowing easy checking of the entry as to correctness and easy correction of errors, if any.

It is a further object of the invention to eliminate aforesaid inconvenience involved in writing control data on a pattern information recording medium such as paper tape.

In order to achieve these objects, the invention provides an apparatus for recording pattern information for control of V-bed flat knitting machine operation, which is such that if pattern information represented by certain codes is input into display and storage means, not only pattern data for individual knitting courses, but also control data for such courses can be derived from the pattern information stored and can easily be recorded on a recording medium such as tape. More specifically, the pattern information recording apparatus of the invention comprises display means for pattern information which, when pattern information on a fabric to be knitted on a V-bed flat knitting machine, as analyzed into units of pattern information, one unit representing one or two stitches formed on one or both of one pair of opposed needles, front and back, is entered therein in coded color or color number for each respective unit pattern information, displays in coded colors on a graphic color monitor individual units of pattern information for each wale of stitches and individual units of pattern information for each course of stitches, with said information units for each wale arranged in dots on one of X and Y coordinate axes and said information units for each course arranged in dots on the other coordinate axis, each unit pattern information being represented by one dot, pattern information storage means for storing pattern information input into said display means, interpreter means for reading the pattern information stored in said storage means in the sequence of knitting to explode pattern information for each course of stitches into a required number of knitting courses of a carriage and for translating the so exploded information into pattern data and/or control data for each knitting course, and write means for writing said pattern data and/or control data for each knitting course onto a desired recording medium.

The above and other objects and features of the invention will appear more fully hereinafter from a consideration of the following description taken in connection with the accompanying drawings.

BRIEF DESCRIPTION OF THE DRAWINGS

FIGS. 2-1 through 2-12 are flow sheets of programs stored in a memory board;

FIG. 3 is a knitting pattern notation showing by way of example a knitted fabric having racked patterns and the like;

FIG. 4 is a front view of a picture displayed on a graphic color monitor; and

FIGS. 5-1 through 5-3 are explanatory views showing exploded control and pattern datas and conditions of formed stitches for individual knitting courses.

DESCRIPTION OF THE PREFERRED EMBODIMENT

Figure 1:
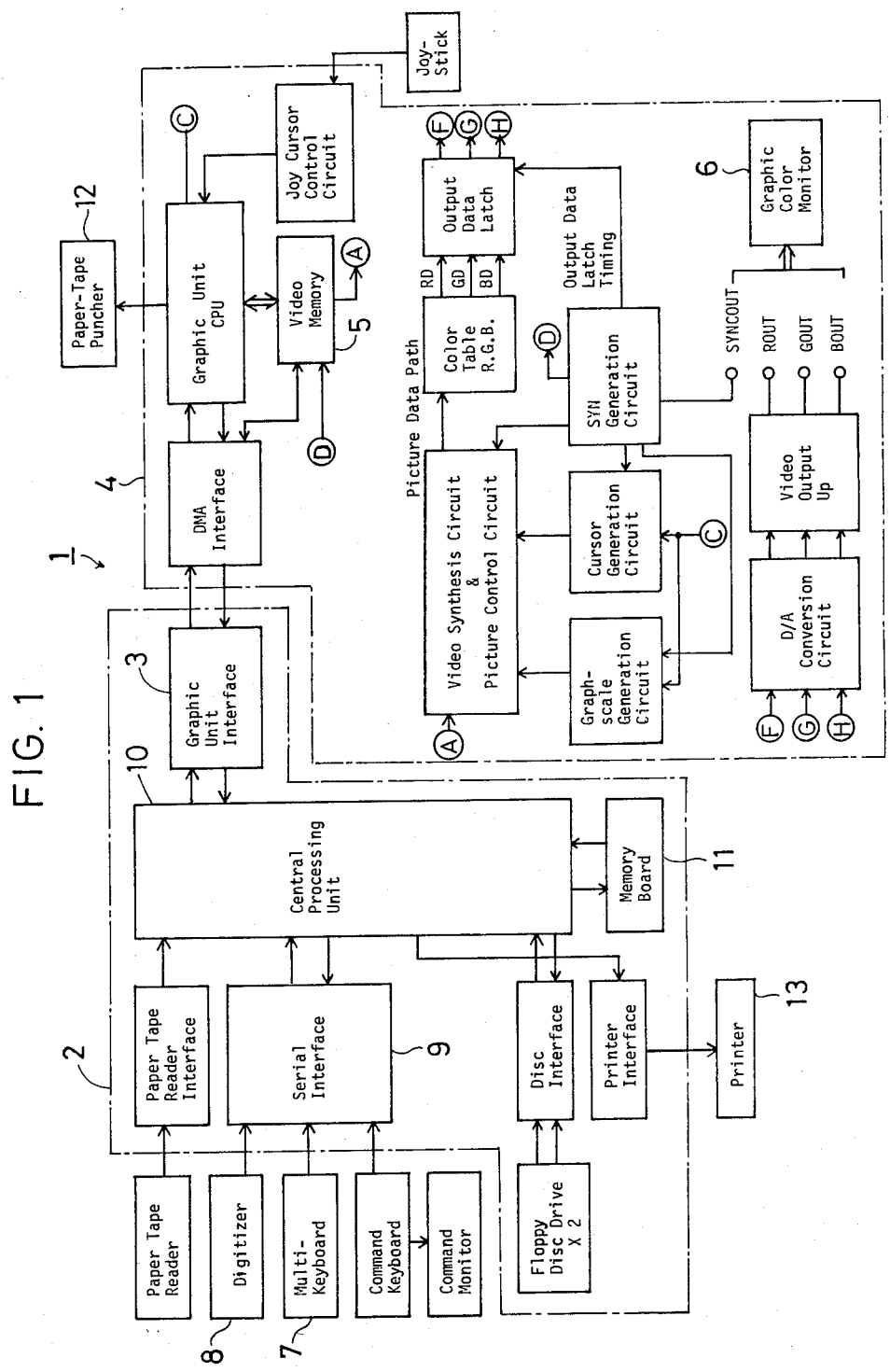
FIG. 1 is a block diagram showing the construction of one form of pattern information recording apparatus embodying the present invention.

Referring first to FIG. 1, numeral 1 generally designates a recording apparatus for pattern information according to the invention, which includes a process unit 2 and a graphic unit 4 connected thereto through a graphic interface 3. The graphic unit 4 includes a video memory 5 and a graphic color monitor 6 like CRT display. The graphic unit 4 is such that when pattern information on a fabric to be knit is input into a serial interface 9 through input means such as a multi-keyboard 7 or a digitizer 8, the pattern information is displayed on the graphic color monitor 6, with pieces of such information for each course arranged on X coordinate axis and those for each wale arranged on Y coordinate axis, the pattern information entered being stored in the video memory 5. In the recording apparatus 1 according to the invention, pattern information on the fabric to be knit on a flat knitting machine is analyzed into units of pattern information, one unit representing stitches formed on one pair of opposed needles, front and back, and those units of pattern information are input in such coded colors or color codes as shown in Table 1.

TABLE 1

| Color Code Table | |
|---|---|
| Color Code | Particulars |
| 1 | Non-selection |
| 2 | Knit a front stitch. |
| 3 | Knit a back stitch. |
| 4, 14 | Cross after knitting a front stitch. The front stitch comes underside. (Use in pair with a cross code in which front stitch comes upperside.) |
| 5, 15 | Cross after knitting a front stitch. The front stitch comes upperside. (Use in pair with a cross code in which front |

TABLE 1-continued

Color Code Table

| Color Code | Particulars |
|---|---|
|  | stitch comes underside.) |
| 6 | After knitting a front stitch, transfer the stitch one pitch leftward. |
| 7 | After knitting a front stitch, transfer the stitch one pitch rightward. |
| 8 | After knitting a back stitch, transfer the stitch one pitch leftward. |
| 9 | After knitting a back stitch, transfer the stitch one pitch rightward. |
| 10, 100 | Cross after knitting a back stitch. The back stitch comes underside. (Use in pair with a cross code in which back stitch comes upperside.) |
| 11 | Tuck a front stitch. |
| 12 | Tuck a back stitch. |
| 13 | Use when points indicating pattern width are required. |
| 14 |  |
| 15 |  |
| 16 | This code indicates portion to be double-cam knit where pattern involves change from double-cam knitting to single-cam knitting or vice versa on a double-cam type machine. |
| 20–23 | Transfer 0–3 pitch to left without knitting a front stitch, then transfer to back bed. |
| 24–26 | Transfer 1–3 pitch to right without knitting a front stitch, then transfer to back bed. |
| 30–33 | Transfer 0–3 pitch to left without knitting a back stitch, then transfer to front bed. |
| 33–36 | Transfer 1–3 pitch to right without knitting a back stitch, then transfer to front bed. |
| 40 | Special control after knitting a front stitch. The stitch comes underside. (Use in pair with a cross code in which front stitch comes upperside.) |
| 50 | Special control after knitting a front stitch. The stitch comes upperside. (Use in pair with a cross code in which front stitch comes under side.) |
| 51 | Knit a front stitch. No links are required even if previous and succeeding courses are back knit. |
| 52 | Knit a back stitch. No links are required even if previous and succeeding courses are front knit. |
| 60 | After knitting a front stitch, transfer the stitch one pitch to left. Special control required in this case. |
| 61–63 | After knitting a front stitch, transfer the stitch 1–3 pitch to left. (If located on the righthand side, the stitch comes front side. If located on the lefthand side, it comes backside.) |
| 64–66 | After knitting a front stitch, transfer the stitch 1–3 pitch to left. Special control is required in this case. |
| 70 | After knitting a front stitch, transfer the stitch one pitch to right. Special control is required in this case. |
| 71–73 | After knitting a front stitch, transfer the stitch 1–3 pitch to right. (If located on the righthand side, the stitch comes front side. If located on the lefthand side, it comes backside.) |
| 74–76 | After knitting a front stitch, transfer the stitch 1–3 pitch to right. Special control is required in this case. |
| 80 | After knitting a back stitch, transfer the stitch one pitch to left. Special control is required in this case. |
| 81–83 | After knitting a back stitch, transfer the stitch 1–3 pitch to left. |
| 84–86 | After knitting a back stitch, transfer the stitch 1–3 pitch to left. Special control is required in the case. |
| 90 | After knitting a back stitch, transfer the stitch one pitch to right. Special control is required in this case. |
| 91–93 | After knitting a back stitch, transfer the stitch 1–3 pitch to right. |
| 94–96 | After knitting a back stitch, transfer the stitch 1–3 pitch to right. Special control is required in this case. |

Figure 2:
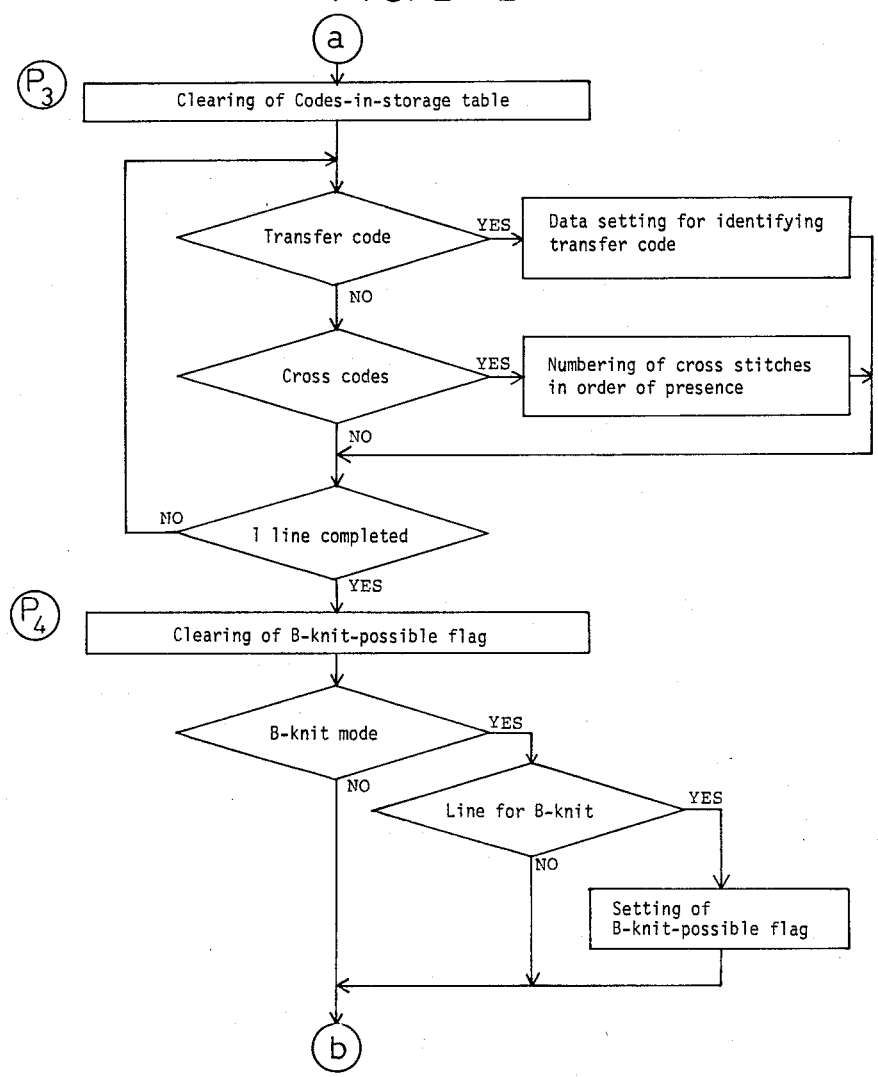

Thus, units of pattern information for each course in the fabric to be knit, as arranged in dots on X coordinate axis, and those for each wale, as arranged in dots on Y coordinate axis, are displayed on the graphic color monitor 6 in coded colors, each unit information being represented by one dot, and pattern information units entered in coded colors or color codes are stored in the video memory 5. The pattern information stored in the video memory 5 is read, in sequential order of knitting, by a central processing unit 10 in the process unit 2 and is translated into pattern and control datas for a required number of knitting courses as exploded in such sequential order according to programs written on a memory board 11. An analytical program for pattern information input datas written on the memory board is shown by way of example in FIG. 2 in the form of a flow chart, wherein:

$P_0$: Initialization of analysis table
Analysis tables for storing analysis results are cleared.

$P_1$: Allocation of knitting information
Units of pattern information transmitted to the memory board 11, represented individually by coded color numbers, are converted into pieces of knitting information as predetermined for the respective color numbers, such as basic codes (e.g. knit, tuck, miss, transfer, cross, etc.), number of racks, and special cross data, which are in turn stored on the memory board 11. Said knitting information is utilized, at $P_3$ and subsequent steps, for setting up and analyzing knitting steps.

$P_2$: Storing knitting information for next line
With knitting information obtained at $P_1$, decision is made as to the necessity of preparation for links or the like step. For this purpose, pattern information for a next succeeding course is converted into a basic code or codes for storage.

$P_3$: Preparation of codes-in-storage table
Since knitting mode and/or sequence vary according to the combination of pieces of knitting information obtained at $P_1$, a codes-in-storage table is prepared as a supplementary data for showing the manner of combination in which the pieces of knitting information are present in storage.

$P_4$: Saving step
A step for minimizing the volume of pattern and control datas into which the knitting information is to be analyzed. In the program shown, decision as to possibility of B-knit mode (utilization of a needle-selection saving function of the knitting machine) is made at this step.

$P_5$: Preparation of cross sorting table
The codes-in-storage table prepared at $P_3$ is checked for presence of a cross code or codes, and analysis is made of such code or codes, if present. The manner of stitch crossing varies depending upon the number and type of cross stitches to be formed on one course. Exclusively for the purpose of cross codes, therefore, a cross sorting table is prepared.

$P_6$: Checking of cross codes for left-hand cable or right-hand cable

Presence of cross codes indicates left-hand and right-hand stitches crossing each other, and one left-hand cross code and one right-hand cross code constitute a pair of cross codes, which represent a cable stitch pattern to be formed. The manner in which such two types of cross codes, right-hand and left-hand, are arranged determines whether a left-hand cable or right-hand cable is to be formed. At this step $P_6$, therefore, checking is made as to whether such pair of codes are for left-hand cable pattern or for right-hand cable pattern, and for this purpose, a table showing cross-code pairs.

$P_7$: Setting of racking pitch for cross codes

The number of stitches involved between stitches to be crossed, that is, the number of grids between two cross codes making a pair, is counted. A racking data is then determined by adding the number of grids so obtained to the number of cross codes.

$P_8$: Checking for tuck cord

The codes-in-storage table obtained at $P_3$ is checked for the presence of a tuck code or codes. If any is present, a flag is set according to the type of tuck.

$P_9$: Checking for transfer code

The codes-in-storage table obtained at $P_3$ is checked for the presence of any rightward or leftward transfer code or codes which may eventually change to position of the relevant stitch or stitches (from front bed to back bed or vice versa). If any such codes are present, a table in which they are stored by types is prepared.

$P_{10}$: Checking for leftward or rightward transfer code

The codes-in-storage table obtained at $P_3$ is checked for the presence of leftward and/or rightward transfer codes (front left, front right, back left, and/or back right) and an analysis of such transfer codes present is made. The analysis includes: on which bed, front or back, the stitch is present, how many needle space the stitch is to be transferred, in which direction it is to be transferred, whether or not any stitch is present at the destination of transfer, and whether the stitch to which the transfer is to be made is front knit or back knit, which conditions require different modes of operation. A sorting table is prepared which shows such analysis.

$P_{11}$–$P_{15}$:

The codes-in-storage table prepared at $P_3$ is checked for the presence of transfer-on-back-bed codes, transfer codes, and/or special codes, and/or whether knit codes only are present. The results of checking are set.

$P_{16}$: Checking for direction of tentative transfer

If a stitch is to be transferred rightward or leftward on the knitting machine, the stitch, if present on the front bed, for example, must be tentatively transferred to the back bed (vice versa in the case of a back-bed stitch) and then the front or back bed must be racked in a longitudinal direction. Thereafter, the stitch must be transferred back to the front bed (or to the back bed in the case of tentative transfer to the front bed). At this step $P_{16}$, the knitting information obtained in the course of steps up to $P_{15}$ is checked for the presence of stitches requiring such tentative transfer, and if any is present, the direction of tentative transfer for the stitch is set.

$P_{17}$: Setting of direction of transfer

The direction of transfer as required in accordance with any cross cord and transfer cord is set (except for any tentative transfer set at step $P_{16}$).

$P_{18}$: Setting of direction of racking

In order to effect knitting patterns involving racking on the basis of settings made at steps $P_{16}$ and $P_{17}$, the required direction of back-bed racking, right or left, is set.

$P_{19}$: Optimization of transfer and crossing steps

If settings made with respect to different codes such as transfer and cross at steps $P_{16}$–$P_{18}$ involve any repetition or redundacy, measures for saving of such repetition or redundacy are effected.

Pattern and control datas for each knitting course as developed in accordance with such program are stored into the video memory 5.

To the graphic unit 4 is connected a paper-tape puncher 12 for punching pattern and control tapes with holes representing pattern and control datas for each knitting course as stored in the video memory 5. To the process unit 2 is connected a printer 13 for printing out, in colored figures and notations, pattern information for knitting fabric and pattern and control datas for each knitting course as stored in the video memory 5.

Figures 2, 3:
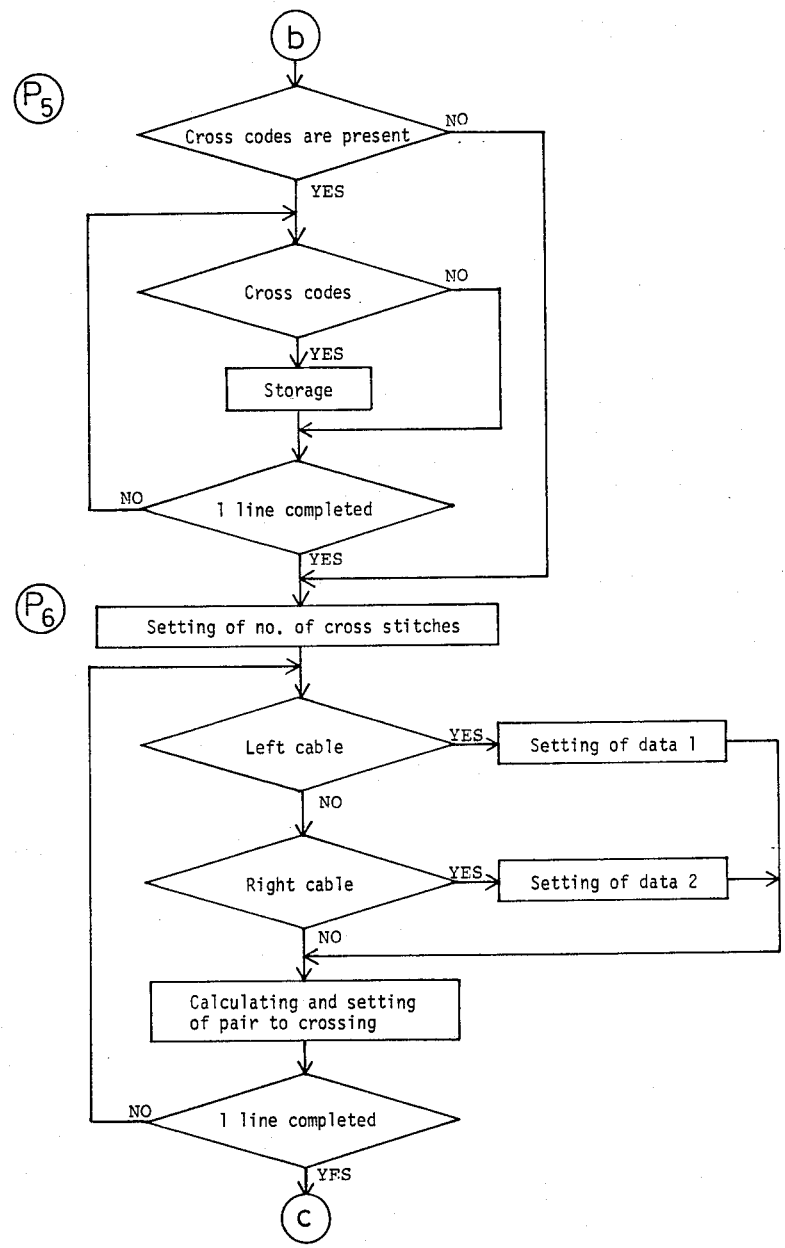

Now, with a knitting fabric A which may be shown in pattern notations for knitting as in FIG. 3, for example, how the pattern information is input into the recording apparatus 1, how the input pattern information is treated in the apparatus 1 in accordance with the aforesaid program, and the results of such treatment will be explained by way of example.

Where a V-bed flat knitting machine is employed, knitting fabric A as shown in knit pattern notation in FIG. 3 may be produced by knitting each notated front stitch by a front one of a pair of needles, front and back, and each back stitch by a back-side needle. Accordingly, each piece of pattern information represented by one symbol may be taken as one unit pattern information which, as already defined, represents one or two stitches formed by one or both of a pair of opposed needles, front and back, on a V-bed flat knitting machine.

Therefore, if the pattern information for knitting fabric A is input into the recording apparatus 1 by manipulating a multi-keyboard 7 and a joy stick thereon, with each unit pattern information notated in FIG. 3 being designated by one dot in one of the color codes specified according to the color code table (Table 1), units of pattern information for each course in knitting fabric A, as arranged on X coordinate axis, and units of pattern information for each wale, as arranged on Y coordinate axis, may be displayed on the graphic color monitor 6 in colors of code numbers 2, 3, 6, 12, 65, 66, 72, and 73 and in a mosaic tone figure. The pattern information so input may be stored into the video memory 5.

Series of pattern information units so stored in the video memory 5 and displayed on the graphic color monitor 6 have pieces of needle selection and control information carried therewith according to the color code table (Table 1). As they are analyzed according to the aforesaid program (FIG. 2) written on the memory board 11, therefore, pattern information for 10 courses in the knitting fabric A is translated into pattern and control datas for individual ones of 20 knitting courses developed from said 10 courses, in sequential order of knitting.

Figures 2, 3, 4, 5, 6:
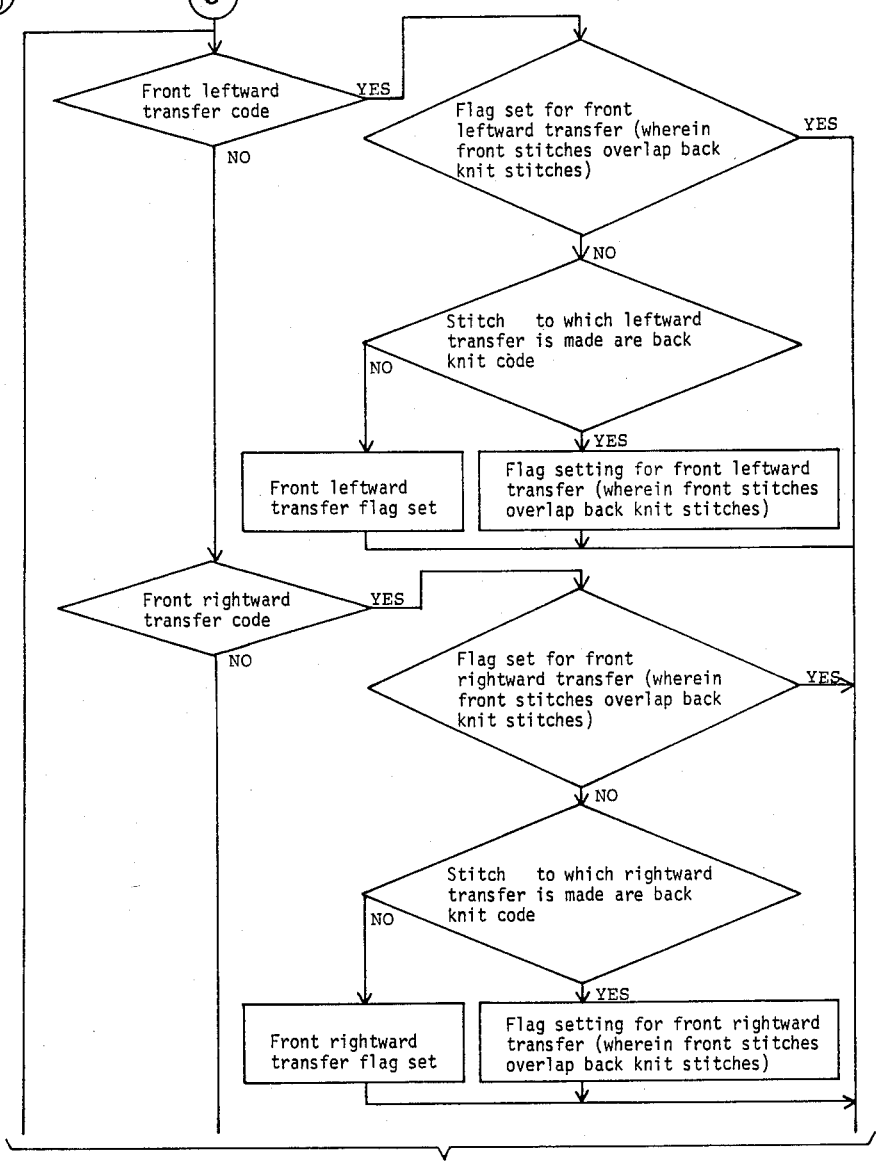
Figures 2, 3, 4, 5, 6, 7:
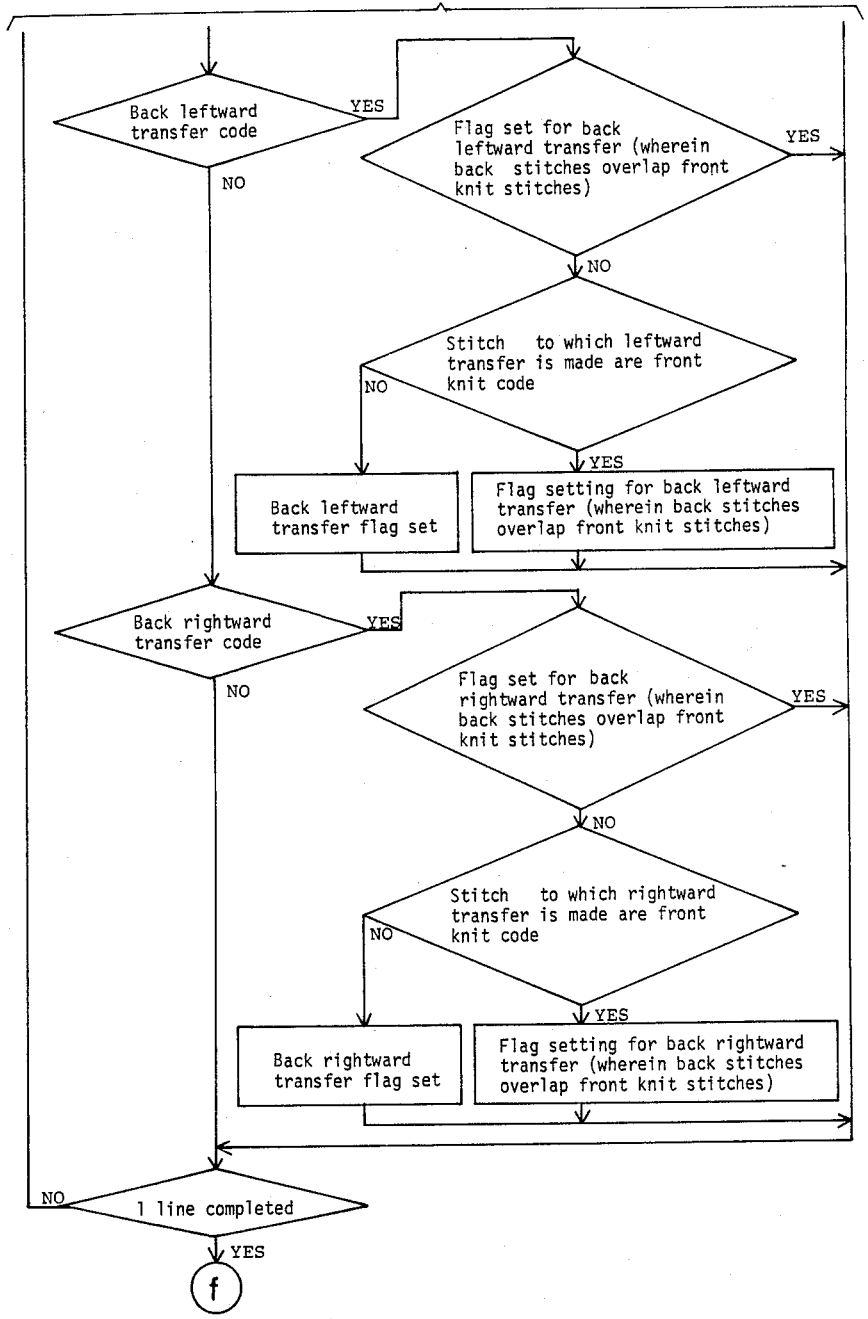
Figures 2, 3, 4, 5, 6, 7, 8, 9:
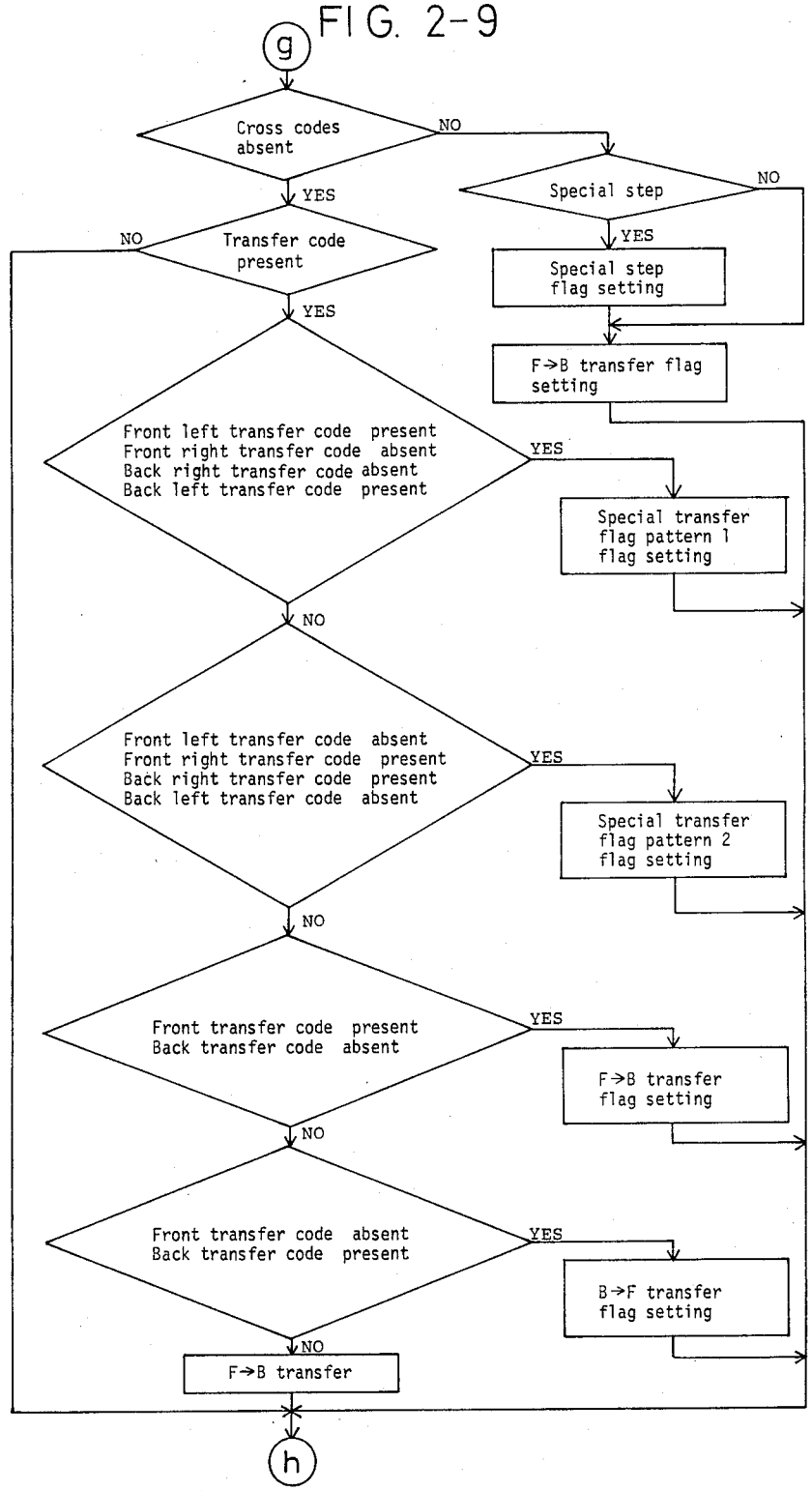
Figures 2, 3, 4, 5, 6, 7, 8, 9, 10:
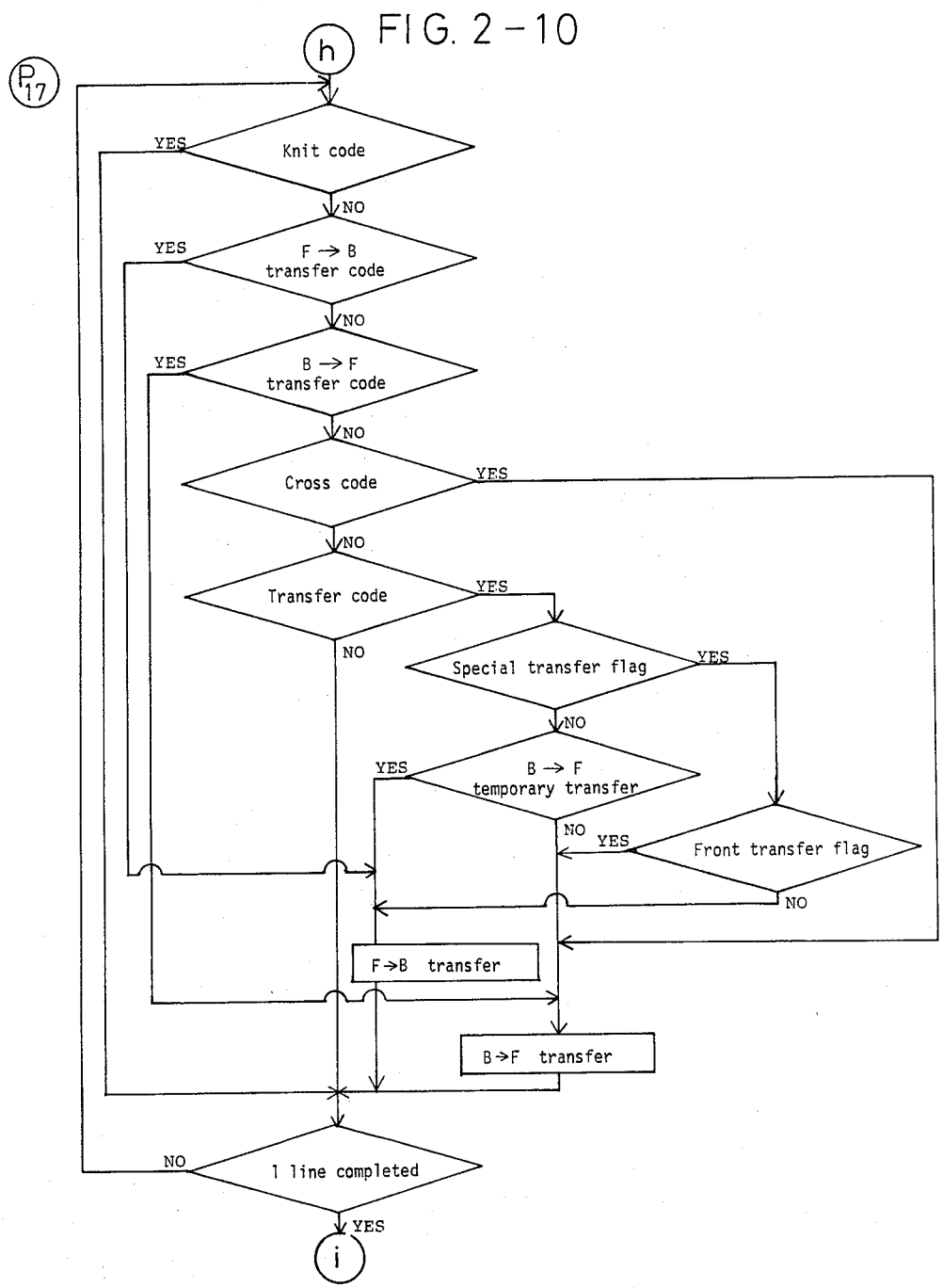
Figures 2, 3, 4, 5, 6, 7, 8, 9, 10, 11:
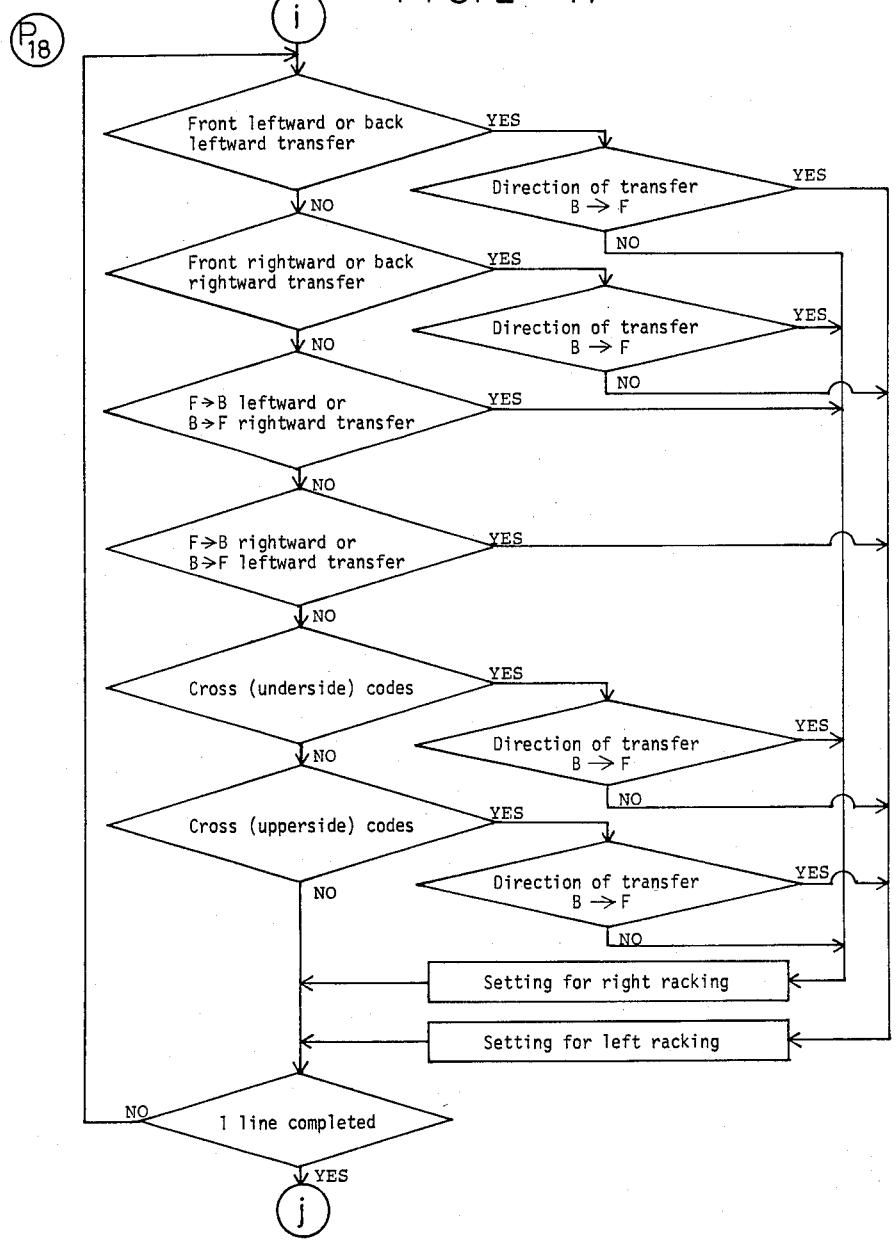
Figure 3:
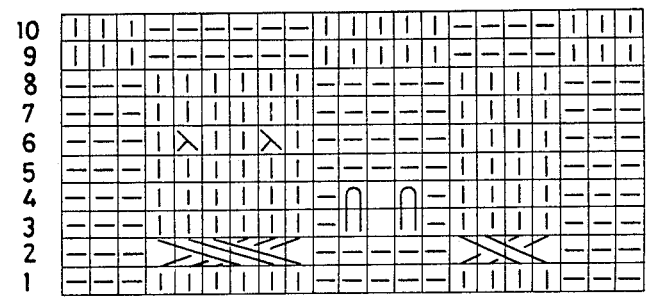
Figure 4:
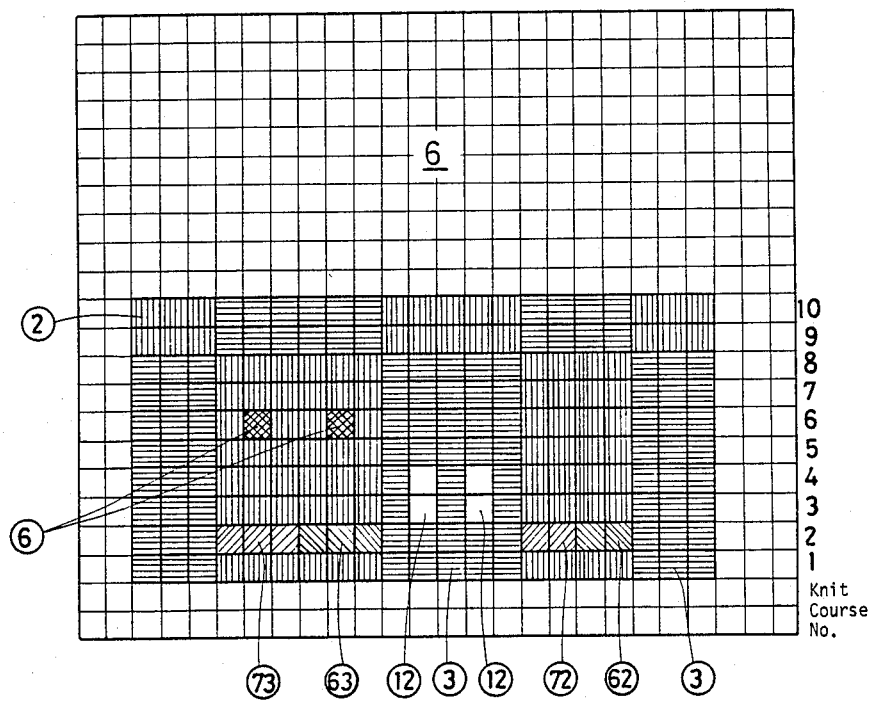

That is, individual units of pattern information arranged in the first, third, forth, fifth, eighth, and tenth courses in the knitting fabric A can be read as including front knit, back knit and tuck knit information only, there being required no links (front knit-back knit conversion relative to an immediate preceding course) nor racking back, and accordingly, such pattern information units for each of the courses are translated into pattern and control datas for one knitting course of the carriage (the 1st, 9th, 10th, 11th, 16th, or 20th knitting course, as the case may be, in FIG. 5). Whilst, the units of pattern information arranged on the 2nd course can be read as including rightward or leftward transfer information, or more specifically, "3×3 stitch" cable pattern and "2×2 stitch" cable pattern. Thus, the pattern information for the second course is translated into pattern and control datas for 7 courses (2nd to 8th knitting courses in FIG. 5) of the carriage as developed from the 2nd-course pattern information. The pattern information units arranged on the sixth course can be read as including transfer information and are thus translated into pattern and control datas for 3 knitting courses (12th to 14th knitting courses in FIG. 5) of the carriage as developed from the sixth course. On the seventh course, the information shown indicates racking back being required, and accordingly same is translated into pattern and control datas for one knitting course of the carriage (15th knitting course in FIG. 5) involving carriage racking. Links forming operation is involved in the nineth course, and the pattern information for the course is thus translated into pattern and control datas for 3 knitting courses of the carriage (17th to 19th knitting courses in FIG. 5 as developed therefrom.

In the recording apparatus aooording to the invention, units of pattern information for each knitting course input and stored into the video memory 5, together with relative position of adjacent units of pattern information and the positions of individual units of pattern information relative to the preceding knitting course, are automatically analyzed according to the program and translated into pattern and control datas for the knitting course for storage into the video memory 5. Therefore, such datas can easily be punched out by the paper-tape puncher 12 into pattern and control tapes. It is also possible that a picture (FIG. 4) displayed on the graphic color monitor 6 for pattern information input as required is printed out as it is by the printer 13 and further that pattern information for each course in the knitting fabric and pattern and control datas for each knitting course can be printed in symbols or marks. The input of pattern information into the video memory 5 can be effected while the video color monitor 6 is watched. Furthermore, the pattern information for the fabric to be knitted on the V-bed flat knitting machine, as analyzed into units of pattern information, each unit being represented by one or two stitches formed on one or both of a pair of opposed needles, front and back, is input in coded color or color codes for individual units of pattern information and in dots each representing one stitch or one pair of stitches, front and back, just in same way as knitting pattern being expressed by a pattern notation. As such, pattern information input operation is very easy and can be performed without difficulty by an unskilled operator who is not well acquainted with the construction of the knitting machine. A display picture on the video color monitor 6 can be depicted efficiently and while being corrected, by using line-draw and paint-out techniques.

A picture displayed on the video color monitor upon input of pattern information shows the construction and pattern of a final knit fabric in colors, from which it is easy to envisage the construction and pattern of the fabric in its final knit state. Therefore, the pattern information recording apparatus of the invention is advantageous in that even where a designer designs construction and pattern for a knit fabric directly on the graphic color monitor by sketching a rough picture and freely correcting same, the pattern so designed can, without difficulty, be fetched in the form of pattern tape and/or control tape having pattern data and/or control data recorded thereon for control of knitting operation on the flat knitting machine.

Another advantage of the recording apparatus of the invention is that the pattern information input into the apparatus can be not only recorded on paper by aforesaid paper-tape puncher 12 and/or printer 13, but same may be recorded, as electrical data, on any desired recording medium such as floppy disc or magnetic tape.

Furthermore, the picture displayed on the graphic color monitor and stored in memory means can at any time be printed out as a colored picture as such, or can be directly photographed, for preservation of same as an easy-to-read picture. Therefore, such a print or picture, if kept in storage together with other record mediums, such as pattern tape and control tape, provides very convenient means for identifying at a glance the pattern information recorded on such mediums.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for recording pattern information, comprising display means for pattern information which, when pattern information on a fabric to be knitted on a V-bed flat knitting machine, is entered thereinto in terms of units of pattern information one unit representing one or two stitches formed on one pair of opposed needles, front and back, in coded color or color code for each respective unit pattern information and according to a color code table, display in coded colors on a graphic color monitor individual units of patterns information for each wale of stitches and individual units of pattern information for each course of stitches, with said information units for each wale arranged in dots on one of X and Y coordinates axes and said information units for each course arranged in dots on the other coordinate axis, each unit pattern information being represented by one dot, pattern information storage means for storing pattern information input into said display means, interpreter means for reading the pattern information stored in said storage means in the sequence of knitting and for translating the pattern information for each course of stitches into pattern data and control data for a required number of knitting courses and write means for writing said pattern data and control data for each knitting course onto a desired recording medium.

* * * * *

UNITED STATES PATENT AND TRADEMARK OFFICE
CERTIFICATE OF CORRECTION

PATENT NO. : 4,608,642

DATED : August 26, 1986

INVENTOR(S) : Masahiro Shima

It is certified that error appears in the above-identified patent and that said Letters Patent is hereby corrected as shown below:

Col. 10, line 48 change "patterns" to --pattern--.

Col. 10, line 52 change "coordinates" to --coordinate--.

Signed and Sealed this

Ninth Day of December, 1986

Attest:

DONALD J. QUIGG

Attesting Officer

Commissioner of Patents and Trademarks